C. E. RING.
LAWN MOWER SHARPENER.
APPLICATION FILED NOV. 19, 1912.
1,071,580.
Patented Aug. 26, 1913.
2 SHEETS—SHEET 1.
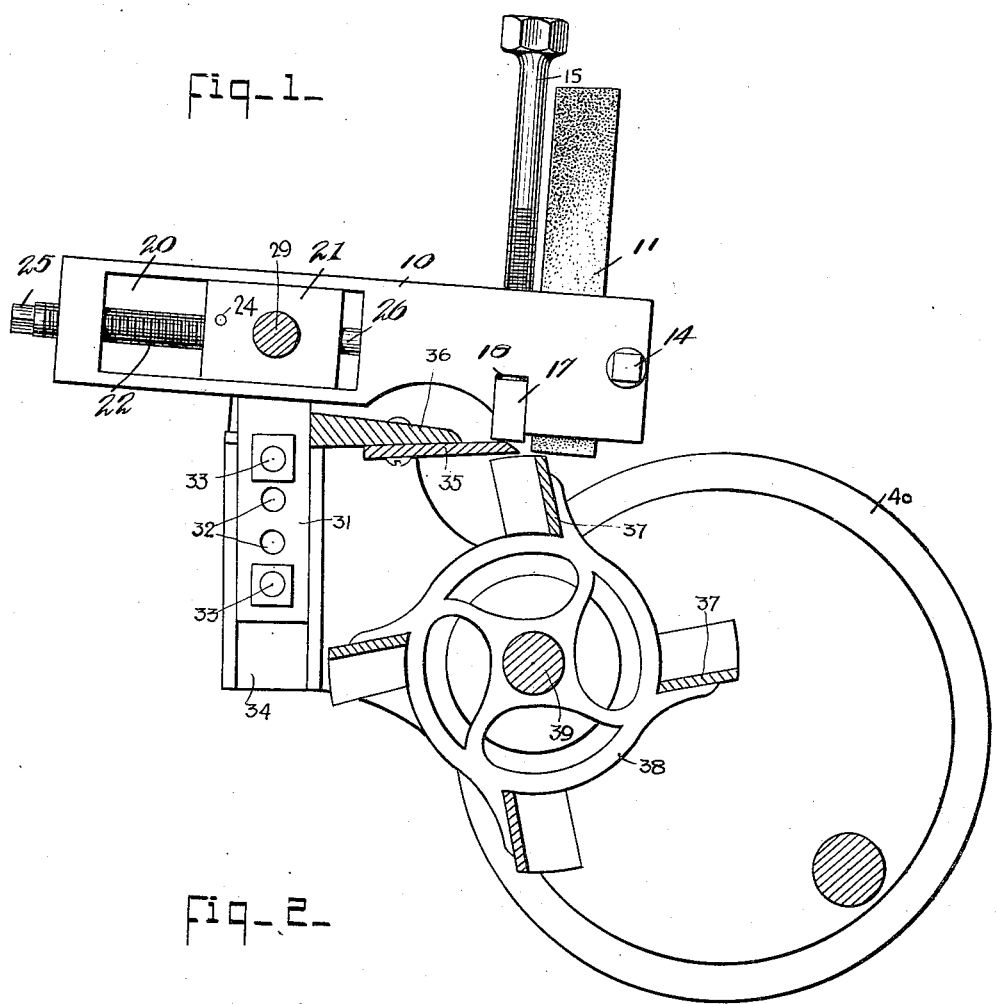
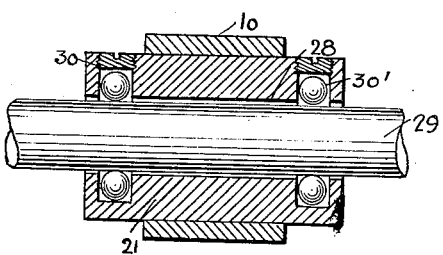
WITNESSES
Frank C. Palmer
B Joffe
INVENTOR
CHARLES E. RING.
BY
ATTORNEYS

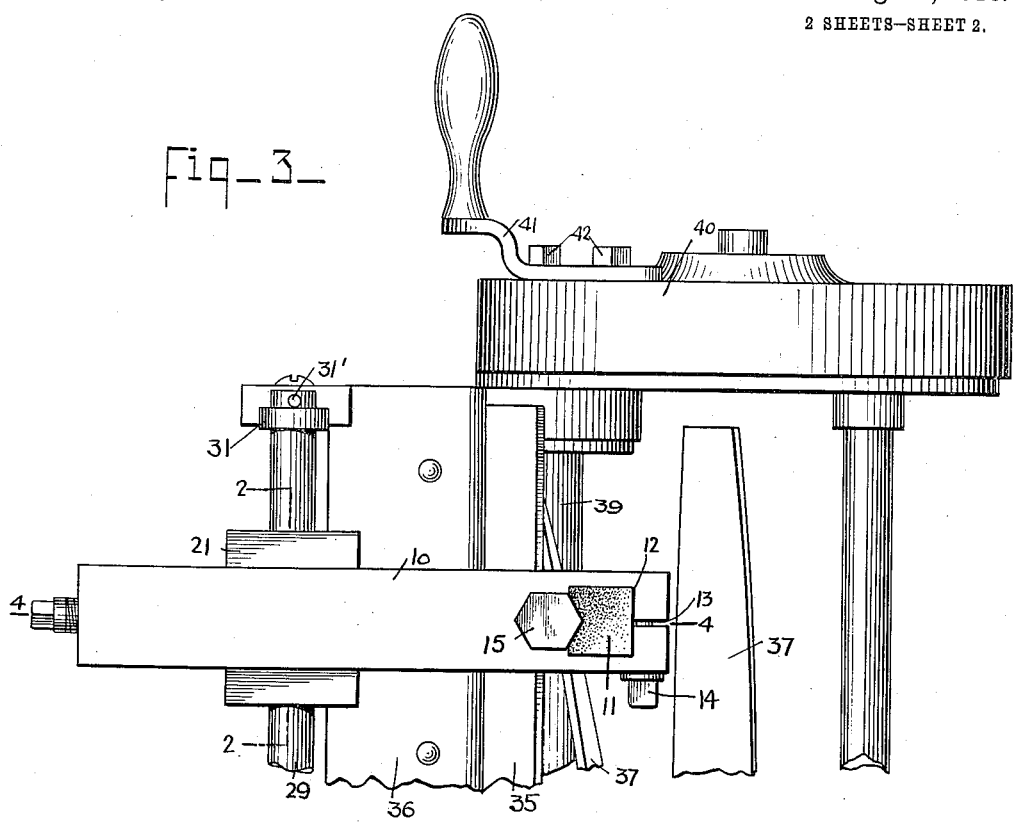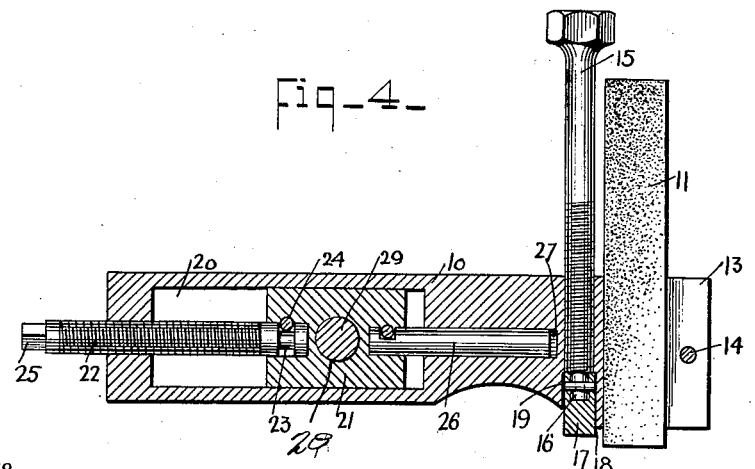

UNITED STATES PATENT OFFICE.

CHARLES E. RING, OF BEDFORD CITY, VIRGINIA, ASSIGNOR OF THREE-FOURTHS TO JAMES McINTYRE, JOHN PITTS, AND CHARLES L. MOSBY, OF BEDFORD CITY, VIRGINIA.

LAWN-MOWER SHARPENER.

1,071,580.  Specification of Letters Patent.  Patented Aug. 26, 1913.

Application filed November 19, 1912. Serial No. 732,252.

*To all whom it may concern:*

Be it known that I, CHARLES E. RING, a citizen of the United States, and a resident of Bedford City, in the county of Bedford and State of Virginia, have invented a new and Improved Lawn-Mower Sharpener, of which the following is a full, clear, and exact description.

This invention relates to sharpeners for lawn mowers, and has reference more particularly to the class which comprises a support carrying a sharpening stone slidably mounted on the lawn mower frame when desired to sharpen the mowing knives.

An object of the invention is to provide an inexpensive, simple and reliable sharpener by means of which the rotating knives can be properly sharpened with reference to the stationary knife, and in which the sharpening stone is guided by the stationary knife.

Reference is to be had to the accompanying drawings forming a part of this specification, in which similar characters of reference indicate corresponding parts in all the views.

Figure 1 is a cross section through an inverted lawn mower in position for sharpening the knives, provided with an embodiment of my invention for the same; Fig. 2 is a section on the line 2—2 of Fig. 3; Fig. 3 is a plan view on Fig. 1; and Fig. 4 is a section on the line 4—4 of Fig. 3.

Referring to the drawings, 10 represents the main body of the sharpener carrying near one end the sharpening stone 11, for which an aperture 12, similar to the cross section of the stone, is provided, and is preferably of angular form. A slit 13 is formed in the end of the body 10 leading to the aperture 12, so that by means of a stud bolt 14, positioned across the slit, the stone 11 is secured or clamped in the aperture 12 of the body. Adjacent to the stone 11, central and parallel with the same, at the opposite side of the slit, is a bolt 15 threaded into the body, and provided on its reduced end 16 with a block 17, for which a recess 18 is formed transversely in the body 10. The reduced portion 16 of the bolt 15 is provided with a groove so that a pin 19 positioned in the block 17 permits the rotation of the bolt 15 and prevents the disengagement of same from the block. The purpose of the bolt 15 and block 17 will appear hereinafter.

At the opposite end of the body 10, running longitudinally of same, a rectangular slot 20 is provided, in which a bearing block 21 is mounted. The block 21 is positioned centrally with the body 10 and in the longitudinal axis of the body. It is provided at one end with a rod 22 projecting through the end of the body 10 and threaded into the same. The end of the rod 22 engaging the block 21 is provided with a groove 23 so that a pin 24, positioned in the block 21, prevents the longitudinal displacement of the rod independent of the block, while it permits the rotation of the threaded rod 22 by means of the square head 25 provided at the end opposite the grooved end. The end of the block 21 opposite the one having the threaded rod, in the same axial line, is provided with a rod 26 fixed in any suitable way in the body of the block 21, and it is guided by a hole 27 formed in the body 10 so that when the bearing block 21 is moved longitudinally in the slot 20 of the main body 10 by means of the threaded rod 22, the rod 26 positioned at the opposite end of the bearing block 21 moves in the hole 27.

The bearing block 21, centrally and normally to the longitudinal axis of the main body 10, is provided with a block 21 is provided with grooves through which a rod 29 projects. The orifice 28, near its ends which opens into orifice 28 is provided with grooves 30 into which a number of balls are fitted, forming a bearing for the rod 29.
The balls 30' are placed in position after the rod 29 is projected through by removing a screw threaded into the body of the bearing block 21 registering with the grooves, not shown in the drawing. The rod 29 running transversely and normally to the longitudinal axis of the main body 10 is in length equal to the width of the frame of the lawn mower for which the sharpener is intended, and on said rod 29 plates 31 are provided at each side of the bearing block 21, and are adapted to engage the frame of the lawn mower. The plates 31 have a series of apertures 32 by means of which the same can be secured to the frame of the lawn mower. For different widths of lawn mowers, the rod 29 will be of different length to fit in the place of the wooden roller which is removed when the rotating knives are to be sharpened.

To sharpen the rotating knives in a lawn mower, the same is inverted, the wooden roller of the lawn mower is removed from the guideways 34 by simply disengaging the bolts 33 by means of which the same is attached to the sides of the frame of the lawn mower, and the plates 31 are then fitted into the guideway 34 of the frame of the lawn mower and secured thereto by means of the bolts 33 engaging the orifices 32. Thereby the plates 31 support the rod 29 and the sharpener mounted on the rod 29. The main body 10 is so placed that the sharpening stone 11 is over the rotating knife, with the block 17 resting upon the stationary knife 35 attached to the cross piece 36 of the frame of the lawn mower, (see Fig. 1). By turning the threaded rod 22, the main body 10 is moved so as to bring the sharpening stone 11 substantially over the axis of rotation of the rotating blades. The amount of sharpening is regulated by screwing in or out of the bolt 15, which raises or lowers the main body 10 as the block 17 is forced against the stationary blade 35, the main body rotating about the rod 29 as a center when the bolt 15 is screwed in or out. When the sharpener is properly positioned over the rotating blades 37 to sharpen the same, the blades 37 are revolved through the medium of the wheel 40 actuated by the crank arm 41, and by reciprocating the sharpener on the rod 29 simultaneously with the rotation of the blades, the same are sharpened. To rotate the wheel 40 when the lawn mower is inverted for sharpening the knives, I provide a crank arm 41 attached to the wheel 40 by means of set screws 42.

The knives 37 being set in rotation by the rotation of the crank 41, the main body 10 of the sharpener is then reciprocated on the rod 29 to and fro from one end to another, thereby coming in contact uniformly with the edges of the knife through its entire length, the sharpener being guided by the stationary knife, that is, having the same contact at one end as at the other. To prevent the displacement of the rod 29 in the plates 31, pins 31' are provided at each end of the rod 29 projecting through the plates 31.

It can be easily seen that with my sharpener, the rotating knives are uniformly sharpened so as to form a perfect cylinder and thereby, when cutting in reference to the stationary knife, they will always form the same clearance with said stationary knife, and therefore will cut the grass uniformly.

While my device is described in connection with a lawn mower, and primarily intended for same, it can be used, as can be easily seen, with any mechanism including a rotating knife.

Having thus described my invention, I claim as new and desire to secure by Letters Patent—

1. In a device of the class described for use with mechanism including a rotating knife, a detachable support parallel to the axis of rotation of the knife, a block adapted to reciprocate longitudinally thereof, a carrier having a slot receiving the said block, means in said carrier on said block whereby said carrier may be reciprocated perpendicularly to said support on said block and transversely with said block, and a sharpening element on said carrier.

2. A device of the class described, for use with mechanism including a rotating knife, comprising a detachable support on the mechanism parallel to the axis of rotation of the knife, a longitudinal carrier transversely mounted on said support, and adapted to reciprocate on the same, a sharpening element adjustably mounted in said carrier normal to the axis of rotation of the knife, adjustable means in said carrier co-acting with said support whereby said carrier can be translated perpendicularly to said support and thereby translating said sharpening element with respect to the axis of rotation of the knife, and means adjacent to said sharpening element in said carrier co-acting with a member of the mechanism whereby the amount of sharpening of said knife is limited, and made uniform through the length of the knife.

3. A device of the class described for use with mechanism including a rotating knife, comprising a detachable support on the mechanism parallel to the axis of rotation of the knife, a longitudinal carrier transversely mounted on said support and adapted to reciprocate longitudinally thereof, said carrier having a slot, a block slidably mounted in said slot and engaging said support, means associated with said block and carrier whereby said carrier may be translated in a direction normal to said support, a sharpening element in said carrier, means for adjusting the same in said carrier, and adjustable means adjacent to said sharpening element in said carrier and co-acting with said mechanism, whereby said carrier can be raised or lowered with reference to the axis of rotation of the knives on the said support as a pivot.

4. A device of the class described, for use with mechanism including a rotating knife, comprising a detachable support on the mechanism parallel to the axis of rotation of the knife, a longitudinal carrier transversely mounted on said support and adapted to reciprocate longitudinally thereof, said carrier having a slot, a block slidably mounted in said slot and engaging said support, means associated with said block and carrier whereby said carrier may be translated in a direction normal to said support, a sharpening element in said carrier normal to same and to said support on which said carrier is mounted, means for adjusting the said sharpening element in said carrier, a bolt threaded in said carrier adjacent and parallel to said sharpening element and central with it, and a block associated with said bolt and said carrier whereby said block co-acts with the mechanism and whereby the carrier may be raised or lowered with reference to the axis of rotation of the knife on the said support as a pivot.

In testimony whereof, I have signed my name to this specification in the presence of two subscribing witnesses.

CHARLES E. RING.

Witnesses:
C. N. CRAWFORD,
F. P. GRAVES.